United States Patent [19]
Johannesen et al.

[11] 3,967,705
[45] July 6, 1976

[54] APPLICATION ADJUSTER FOR DISC BRAKE

[75] Inventors: Donald D. Johannesen; James J. Colpaert, both of South Bend, Ind.

[73] Assignee: The Bendix Corporation, South Bend, Ind.

[22] Filed: Apr. 2, 1975

[21] Appl. No.: 564,511

[52] U.S. Cl. .................. 188/71.9; 188/79.5 GE; 188/196 BA; 192/111 A
[51] Int. Cl.² .................................. F16D 65/56
[58] Field of Search..... 188/71.9, 196 BA, 79.5 GE, 188/79.5 S; 192/111 A

[56] References Cited
UNITED STATES PATENTS

| | | | |
|---|---|---|---|
| 2,669,327 | 2/1954 | Chamberlain et al. | 188/71.9 |
| 3,261,435 | 7/1966 | Beatty | 188/79.5 GE X |
| 3,331,472 | 7/1967 | Swift | 188/196 BA X |
| 3,746,133 | 7/1973 | Hauth | 188/71.9 X |

*Primary Examiner*—George E. A. Halvosa
*Attorney, Agent, or Firm*—Ken C. Decker; William N. Antonis

[57] ABSTRACT

A heavy duty disc brake is disclosed which is provided with an automatic adjuster mechanism to limit retraction of the friction elements to a substantially predetermined amount to thereby maintain the running clearances between the friction elements and the brake rotor substantially constant. The adjustment mechanism includes an extensible member which is slidably mounted within the caliper housing and which interconnects a mechanical actuating mechanism and a piston which engages one of the friction pads. The piston is slidably mounted within the housing and is disposed between the extensible element and the corresponding friction pad, and the piston carries a spring-actuated pawl. The pawl is adapted to engage corresponding ratchet teeth on one portion of the extendible member, which includes a pair of threadedly interconnected, relatively rotatable members, designed so that upon relative rotation between the members, the extendible member extends. When a brake application is effected, the mechanical actuator thrusts the extendible member, and therefore the piston and the friction elements, toward the rotor. Upon brake release, a spring yieldably urges the extendible member toward a predetermined brake release position. If the extendible member must travel more than a predetermined distance relative to the piston to achieve the brake released position, the pawl indexes to another one of the aforementioned teeth carried on the extendible member. Therefore, on a subsequent brake application, the pawl rotates one portion of the extendible member relative to the other portion, consequently extending the member.

4 Claims, 3 Drawing Figures

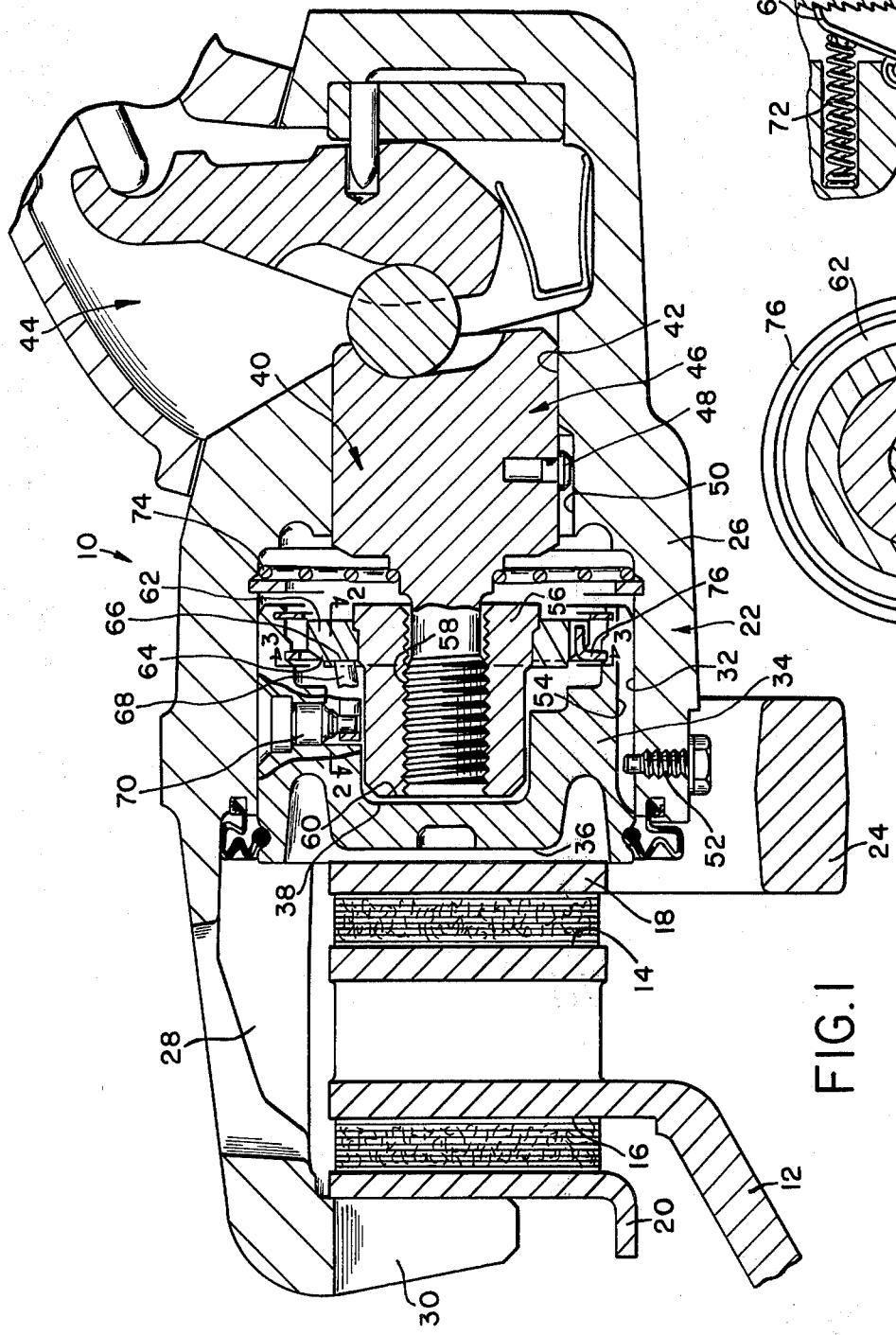
FIG. 1
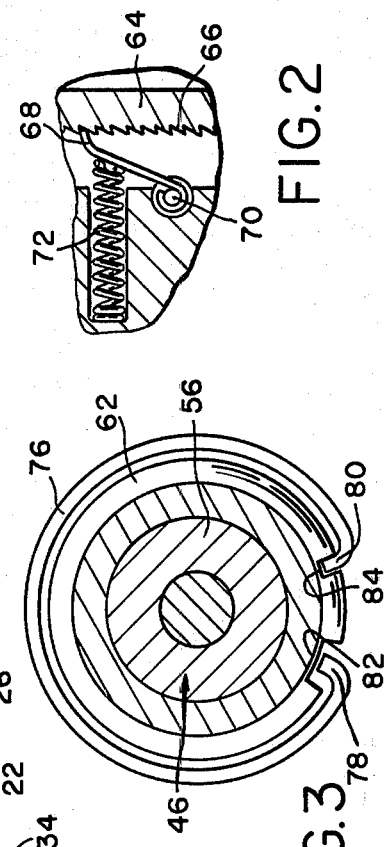
FIG. 2
FIG. 3

APPLICATION ADJUSTER FOR DISC BRAKE

BACKGROUND OF THE INVENTION

This invention relates to an automatic adjuster mechanism for a mechanically actuated disc brake mechanism.

Disc brakes actuated by mechanical mechanisms normally are designed with only a relatively limited application stroke. However, as the friction elements used in the disc brake wear, the actuating stroke tends to increase unless the retraction of the friction element is controlled. For this reason, most disc brakes with mechanical actuators require an automatic adjustment mechanism which is responsive to increased stroke of the actuating piston during brake actuation to thereby adjust the brake so that the retraction of the piston and the corresponding friction elements are limited to a substantially predetermined amount, so that the stroke required of the mechanical actuator does not increase as the friction linings wear.

The present invention discloses an automatic adjuster for a mechanically actuated disc brake which uses many of the same components used in the wedge brake adjuster disclosed in U.S. Pat. No. 3,246,723, which is owned by the assignee of the present invention. However, this adjuster has been redesigned to accommodate the disc brake structure, and has also been changed so that the brake adjustment takes effect on the brake application stroke, but only prior to the time that substantial braking forces have been generated. The adjustment mechanism indexes on the brake release stroke upon movement of the extensible member in excess of a predetermined distance.

SUMMARY OF THE INVENTION

Therefore, an important object of our invention is to provide a mechanical actuator for a disc brake which effects brake adjustment on the brake actuating stroke.

Another important object of our invention is to provide an automatic adjuster for a disc brake which actuates on that portion of the actuating stroke before substantial braking forces are transmitted through the adjustment mechanism to effect the brake application.

Another important object of our invention is to provide an automatic adjuster for mechanically actuated heavy duty disc brakes which is immune to variations in adjustment caused by variations in the brake application force.

DESCRIPTION OF THE DRAWINGS

FIG. 1 is a fragmentary, longitudinal, cross-sectional view of a mechanically actuated disc brake having an automatic adjustment mechanism made pursuant to the teachings of our present invention; and FIG. 2 is a fragmentary, cross-sectional view taken substantially along line 2—2 in FIG. 1.

FIG. 3 is a cross-sectional view taken substantially along line 3—3 in FIG. 1.

DETAILED DESCRIPTION

Referring now to the drawings, a disc brake generally indicated by the numeral 10 includes a rotor 12 having a pair of opposed friction faces 14 and 16. A pair of friction elements 18, 20 are mounted adjacent the friction faces 14, 16, respectively, and are adapted to engage the latter when a brake application is effected. A caliper housing generally indicated by the numeral 22 is slidably mounted on a fixed support member 24 by any appropriate mechanism well known to those skilled in the art, such as the mechanism disclosed in U.S. Pat. No. 3,388,774, owned by the assignee of the present invention. The fixed support 24 is bolted to a non-rotative portion of the vehicle, such as the vehicle spindle housing. As more completely disclosed in the aforementioned application, the friction element 18 is anchored on the fixed support or torque member 24.

The caliper housing 22 includes actuating portion 26 which extends substantially parallel to the friction face 14 of the rotor 12, a bridge portion 28 which traverses the periphery of the rotor 12, and an inwardly extending portion 30 which extends radially inwardly generally parallel to the friction face 16. The friction element 20 is secured to the inwardly extending portion 30.

The housing 22 defines a larger diameter bore 32 therewithin which slidably receives a piston 34. The front face 36 of the piston 34 engages the friction element 18, and the rear face 38 of the piston 34 is adapted to be engaged by an extensible member generally indicated by the numeral 40 which is slidably supported in a smaller diameter bore 42, but which projects into the larger diameter bore 32 as illustrated in the drawing. The extensible member 40 serves as a force transmitting link between the piston 34 and the mechanical actuator generally indicated by the numeral 44. Mechanical actuator 44 is identical to the actuator disclosed in co-pending U.S. patent application No. 564,507, filed Apr. 2, 1975 filed herewith, owned by the assignee of the present invention, and incorporated herein by reference.

The extensible member 40 includes a first portion generally indicated by numeral 46 which carries a projection 48 which engages a spline 50 provided in the wall of the bore 42 to thereby prevent rotation of the portion 46 with respect to the housing 22. Similarly, another projection 52 carried by the housing 22 extends into a spline 54 carried by the piston 34 to prevent rotation of the piston with respect to the housing. The extensible member 40 also includes a second portion 56 which is threadedly engaged with the portion 46 by threads 58. The portion 56 is consequently rotatable relative to the portion 46, and upon rotation in the appropriate direction, depending upon the pitch of the threads 58, rotation of the portion 56 will extend the length of the member 46. As can be seen in the drawing, the clearance between the end 60 of the portion 56 the rear face 38 of the piston 34 is a relatively small amount, equal to the desired running clearance between the friction element 18 and the friction face 14. The portion 56 further includes a flange 62 which projects radially from the portion 56, and which defines a face 64 which faces into the piston 34. Ratchet teeth 66 are provided on the face 64, and the ratchet teeth 66 are adapted to be engaged by a pawl 68 which is mounted on the piston 34 by a pivot 70. A spring 72 yieldably urges the pawl 68 into engagement with one of the ratchet teeth 66. Another spring 74 yieldably urges the extensible member 40 toward the predetermined brake release position illustrated in the drawing upon release of the actuating mechanism 44.

An anti-backlash spring 76 is also provided to prevent the extensible member 40 from "backing off" or returning to its original position after a brake adjustment has been effected. Opposite ends of the spring 76 terminate in detents 78, 80 which engage corresponding, arcuately extending recesses 82, 84 which are provided in flange 62. As can be most clearly seen in FIG. 3, the arcuate length of the recess 82 is substantially greater than that of the recess 84. The spring has light frictional engagement with the wall of piston 34 as shown in FIG. 1.

MODE OF OPERATION

Various components of the brake 10 are illustrated in the Figures in the positions which they assume when the brake is released. When a brake application is effected, operation of the actuating mechanism 44 as described in the application referenced hereinabove urges the extensible member 46 to the left viewing FIG. 1. Movement of the member 46 to the left forces the piston 34, and therefore the friction element 18, to the left, thereby forcing the friction element 18 into braking engagement with the friction face 14.

Because of the slidable connection between the caliper housing 22 and the fixed support 24, reaction forces acting through bridge portion 28 of the caliper housing 22 after the friction element 18 engages friction face 14 will urge the friction element 20 into braking engagement with the friction face 16. Upon release of the brake, the spring 74 returns the extensible member 40 to the position illustrated in the drawings. However, the piston 34 and friction element 18 will retract only a sufficient distance to relieve the braking force applied to the rotor 12. Consequently, after a sufficient number of brake applications, the lining on friction elements 16 and 18 will wear thereby increasing the stroke required of the actuating mechanism 44 to move the extensible member 40 from the position illustrated in the housing when a brake application is effected. Consequently, the member 40 has been made extensible, so that the member may extend to compensate for the additional stroke required. As can be seen in the drawings, the pawl 68 engages the teeth 66 of the flange 62. As discussed hereinabove, the spring 74 always returns the extensible member 40 to the predetermined brake release position illustrated in the drawing, regardless of the degree of wear of the friction element. However, if upon release of the brake the extensible element 40 moves a distance great enough to disengage the pawl 68 from the particular tooth with which it was engaged, the spring 72 will urge the pawl about the pivot 70 in a clockwise direction viewing FIG. 2, so that the pawl 68 will index to pick up the next succeeding tooth on the flange 62. Upon a subsequent brake application, movement of the extensible member 40 to the left viewing the Figure will pivot the pawl 68 about the pivot 70 in a counterclockwise direction, and because the pawl has picked up a succeeding one of the teeth 66 of the prior brake release stroke, movement of the extensible member 40 relative to the piston 34 to pivot the pawl 68 about the pivot 70 will cause the pawl 68 to rotate the portion 56 of the extensible member 40 about the portion 46 in a clockwise direction for a predetermined increment. This predetermined increment of rotation will extend the portion 56 from the portion 46 a predetermined axial amount, thereby moving the face 60 of the portion 56 a predetermined increment toward the friction face 14 of the rotor 12. As can be seen most clearly in FIG. 3, rotation of the portion 56 about the portion 46 for the aforementioned clockwise increment will, because of the arcuate length of recess 82, cause the flange 62 to move relative to the end 78 of the spring 76. Because the end 80 of spring 76 is engaged in the narrow recess 84, rotation of portion 56 in the clockwise direction will force the spring 76 to rotate relative to piston 34 for the predetermined increment.

However, upon attempted rotation of the portion 56 in the counterclockwise direction, the diameter of spring 76 will expand to grippingly engage the piston 34 to prevent rotation of the portion 56 in the counterclockwise direction, to thereby prevent the extensible member 40 from retracting. Upon a subsequent brake release, the spring 74 will again urge the extensible member 40 to the position illustrated in the drawings, but because the total length of the extensible member 40 is now extended by the predetermined axial increment caused by rotation of the portion 56 about the portion 46, the clearance between the face 60 of the portion 56 of the extensible member 40 and the rear face 38 of the piston 34 will be maintained substantially constant. The mechanism continues to operate in this manner for succeeding brake applications until further wear of the friction element 18 causes the extensible member 40 to retract relative to the piston 34 an amount upon brake release sufficient to cause the pawl 68 to index another succeeding tooth on the flange 62, whereby upon subsequent brake application stroke the extensible member 40 will be extended for another axial incremental distance.

We claim:
1. In a disc brake:
a rotor having a pair of friction faces;
a pair of friction elements, one of said elements being disposed adjacent each of said friction faces;
a fixed support;
a caliper housing slidably mounted on said fixed support and straddling said rotor, said caliper housing engaging each of said friction elements for urging the latter into braking engagement with their corresponding friction faces when a brake application is effected;
mechanical actuating means within said housing for forcing said friction elements into braking engagement with their corresponding friction faces;
said mechanical actuating means including an axially extensible member slidably mounted in said housing, means for driving said extensible member toward said rotor when a brake application is effected, and ratchet means for extending said extensible member as the extensible member is driven toward said rotor, said extension of the extensible member taking place during brake actuation before substantial braking forces are transmitted through the extensible member;
said caliper housing defining a bore therewithin;
a piston member slidably mounted in said bore and associated with a corresponding one of said friction elements;
said axially extensible member being located between said piston and said means for driving the extensible member toward the rotor, said extensible member engaging said piston during a brake application to urge the latter and the friction element associated therewith toward said rotor, and resilient means operably connected to said extensible member for urging the latter away from the rotor upon brake release;
said ratchet means being carried by said piston member and by said extensible member;
said resilient means urging said extensible member away from said piston upon brake release;

said ratchet means being effective upon release of the brake and movement of the extensible member away from the piston member to index said ratchet means if the extensible member moves away from the piston member by more than a predetermined amount, said ratchet means after indexing upon brake release being effective to extend said extensible member upon a subsequent brake application.

2. The invention of claim 1:

said extensible member including a pair of portions threadedly engaged with one another; and means preventing rotation of one of said portions and of said piston member relative to said caliper housing;

said ratchet means rotating said other portion with respect to the one portion to thereby extend said extensible member.

3. The invention of claim 2:

said ratchet means including ratchet teeth mounted on one of said members and a spring loaded pawl on the other member to engage said ratchet teeth.

4. The invention of claim 3; and a flange extending from said other portion of the extensible member said teeth being carried on said flange and facing said pawl and engageable thereby;

said pawl indexing upon brake release to engage a succeeding tooth on said flange when the extensible member moves away from said piston by more than a predetermined amount, said pawl turning said flange upon a subsequent brake application.

* * * * *